Jan. 6, 1959  H. HAMMEN ET AL  2,867,545
METHOD OF IMPREGNATING POROUS GRAPHITE AND CARBON ARTICLES
Filed June 29, 1956
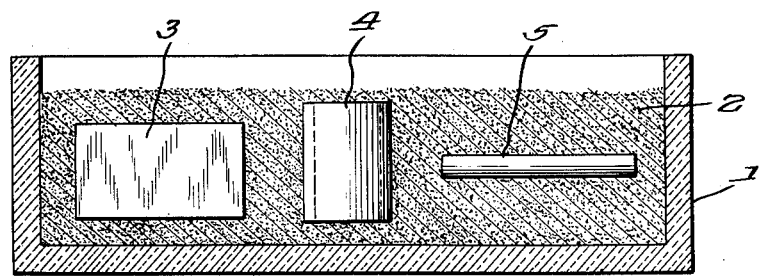
Inventors.
Heinrich Hammen, &
Leo Musiol.
By
Atty.

United States Patent Office 2,867,545
Patented Jan. 6, 1959

2,867,545

METHOD OF IMPREGNATING POROUS GRAPHITE AND CARBON ARTICLES

Heinrich Hammen and Leo Musiol, Meitingen, Germany, assignors to Siemens-Planiawerke Aktiengesellschaft für Kohlefabrikate, Meitingen, near Augsburg, Germany, a corporation of Germany Application June 29, 1956, Serial No. 594,878

Claims priority, application Germany July 22, 1955

2 Claims. (Cl. 117—102)

This invention relates to the manufacture of shaped articles and is particularly concerned with a method of impregnating shaped porous articles, for example, articles made of graphite or carbon and specifically of treating such impregnated carbonaceous articles to improve the quality and appearance thereof.

Shaped graphite and carbon articles are used in the chemical industry as structural elements and as lining materials because of their high heat conductivity and excellent resistance against corrosion. The materials of which these articles are made are however porous and must be impregnated with corrosion proof resin so as to make them gas tight and liquid tight.

The impregnating may be effected in known manner by dipping the articles into a synthetic resin solution or by exposing them prior to impregnating to a vacuum and thereupon applying the impregnating substance by pressure so as to force it into the pores. Hardenable, that is, thermosetting phenol formaldehyde or phenolaldehyde resins are as is known suitable as impregnating substances. Resin adhering to the articles after dipping or pressure-impregnating is wiped off and the articles are thereupon heated to 100° C. and higher temperature depending upon the resin used, so as to effect hardening of the resin. The impregnating and subsequent hardening does not cause any particular difficulties provided a suitable resin is used.

A great disadvantage resides however in the fact that the liquefied resin cannot be completely removed from the surfaces of the articles following the impregnating thereof. After the hardening, there is formed a glassy, very hard and sometimes rather thick film which can be removed only with great difficulties by polishing or machining. The removal of the film is necessary because it affects detrimentally the heat transfer and also the appearance of the articles.

If it is attempted to remove the resin adhering to the surfaces of the articles prior to the hardening, by washing with a solvent, part of the resin in the pores might be brought into solution and removed, which may result after hardening in leakage areas. Even if the adhering resin is in this manner removed from the articles, the formation of the undesired resin film cannot be entirely avoided because part of the resin wells during the hardening from the pores of the articles to the surfaces thereof.

The object of the invention is to avoid the formation of the undesired hard resin film upon the surfaces of porous shaped carbonaceous articles made in usual manner of carbon or graphite and impregnated in usual manner with thermosetting synthetic resin, for example, with phenolformaldehyde resin or with phenolaldehyde resin, commonly used for this purpose.

This object is in accordance with the invention realized by embedding the shaped carbonaceous articles, directly after impregnation thereof with the synthetic resin, in a loosely packed absorbent powdered carbonaceous material corresponding to the material of which the articles are made, for example, graphite or carbon, and applying heat to the receptacle so as to heat the articles to the required thermosetting temperature, thus effecting the hardening of the synthetic resin while the articles are embedded in such powdered material. The freshly impregnated articles may thereby be embedded in the carbonaceous powder without applying any pretreatment such as wiping or solvent treatment. In the case of hollow articles, the powder must also be introduced into the corresponding cavities.

The action of the carbonaceous powder is similar to the action of blotting paper. The powder attracts and absorbs the surplus resin remaining on the surfaces of the articles. Careful investigations have revealed that this action is limited to the surfaces; the resin introduced by the impregnation into the pores, serving to make the material gas- and liquid tight, is not drawn out by the action of the powder. The hardening of the graphite or carbon articles embedded in the graphite or carbon powder is effected in unaltered known manner except, of course, that the hardening is carried out while the articles are embedded in the powdered carbonaceous material.

The shaped articles are removed from the powder bed after the hardening and cleaned of the adhering powder particles by tapping or wiping. Powder residue is thus easily removed from the articles and machining is accordingly unnecessary.

Shaped articles made of graphite or carbon, treated in the described manner, show on their surfaces no trace of a resin film or resin drops; their appearance can hardly be distinguished from that of unimpregnated articles. The method according to the invention not only preserves the surface as it was before impregnation, but has the important advantage of achieving such results without effecting undesired changes in the density characteristics of the impregnated article.

It was found in a series of tests that it is most advantageous to use powdered carbonaceous material for embedding the articles having a particle size on the order of about 1 to 2 mm.

This particle size is important because, if the particles were very fine, for example, of a size less than 0.1 mm., there would be danger of fusing or baking the particles together and adhension thereof to the surface of the impregnated article. Very fine particles would not be well adapted for the purpose because they would not have any noticeable pores capable of absorbing the residual resin. The surfaces of such very fine particles would be completely surrounded by the resin and the particles would in all probability be baked together.

The adsorption or absorption of the residual resin, by the powdered particles may be explained as follows: The powder particles have irregular surfaces while the impregnated articles have smooth surfaces. It is a well known fact that two bodies made of identical material, one with a smooth surface and the other with an uneven surface, exhibit different absorbability with respect to matter to be absorbed; the body with the uneven or irregular surface exhibiting greater absorbability than the body with the smooth surface. The synthetic resin upon the smooth surface of the shaped carbonaceous body accordingly tends to penetrate into the irregularly shaped particles of the absorbent powdered carbonaceous material.

Further investigations have revealed that the method according to the invention is generally suitable for the treatment of porous shaped articles, made for example of porous clay and impregnated with synthetic resin. The invention is not limited to the use of graphite or carbon powder as materials for embedding the articles for the treatment. While materials to be used for forming the absorbent powder bed will generally speaking be of a kind having identical properties, or properties suitably related to those of the material of the articles to be treated, materials such as diatomaceous earth or comminuted absorbent fired ceramic materials which will remain substantially inert with respect to the materials of the articles may also be usable, particularly for the treatment of carbon and graphite articles.

The accompanying drawing shows as an example of the invention a receptacle 1 containing powdered carbonaceous absorbent material 2, with a particle size of about 1 to 2 mm., in which are embedded carbonaceous articles impregnated with artificial thermosetting resin, for example, phenolformaldehyde or phenolaldehyde resin, namely, a plate 3, a tubular body 4, and a rodlike body 5. The articles may be made of carbon or graphite and the absorbent material may be correspondingly respectively carbon or graphite material, at any rate, material which remains inert during the treatment with respect to the material forming the articles. The receptacle may be heated in suitable known manner (not shown) so as to heat the impregnated articles to the required thermosetting temperature for the purpose of hardening the synthetic resin applied thereto. The operating temperature and the time of treatment in the powdered absorbing material will depend upon the size of the impregnated body or bodies and upon the thermosetting time of the synthetic resin employed. For example, phenolaldehyde resins (Bakelite resins) require a setting temperature of 150° C. which is applied for 8 to 12 hours, depending upon the size of the bodies treated.

Changes may be made within the scope and spirit of the appended claims.

We claim:

1. A method of treating shaped porous carbonaceous articles, impregnated with a hardenable thermosetting synthetic resin, to preserve desired surface characteristics of the article, comprising taking the article directly after impregnation thereof with the synthetic resin and embedding it in a mass of loosely packed absorbent carbonaceous powder of a material having properties corresponding substantially to the properties of the material forming the article and capable of removal therefrom after such treatment, heating said absorbent powder so as to heat said article for the purpose of effecting hardening of the synthetic resin while said article is so embedded, the size of the particles of such powder being on the order of about 1 to 2 mm., whereby the synthetic resin on the surface of the article is deposited on the particles of such powder and thus removed from the surface of the article, thereby preventing formation of a synthetic resin film on such surface.

2. A method of impregnating shaped porous carbonaceous articles and preserving desired surface characteristics thereof, comprising applying synthetic thermosetting resin to an article as an impregnating substance therefor, embedding the article, directly following application of such substance, in a mass of loosely packed absorbent carbonaceous powder of a material having properties corresponding substantially to the properties of the material forming the article and capable of subsequent removal therefrom, heating said absorbent powder so as to heat said article for the purpose of effecting hardening of the synthetic resin while said article is so embedded, the size of the particles of such powder being on the order of about 1 to 2 mm., whereby the synthetic resin on the surface of the article is deposited on the particles of such powder and thus removed from the surface of the article, thereby preventing formation of a synthetic resin film on such surface, and following hardening, removing any powder adhering on the surface of the article.

References Cited in the file of this patent

UNITED STATES PATENTS

| | | |
|---|---|---|
| 577,283 | Caffall | Feb. 16, 1897 |
| 2,174,887 | Kiefer | Oct. 3, 1939 |